UNITED STATES PATENT OFFICE.

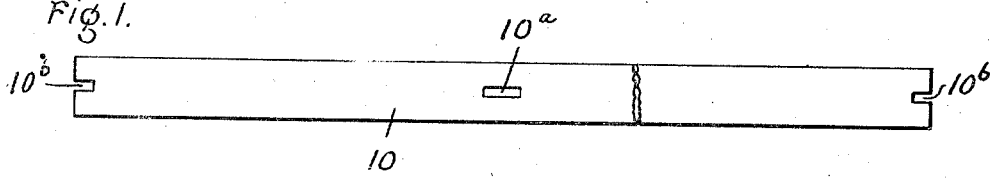
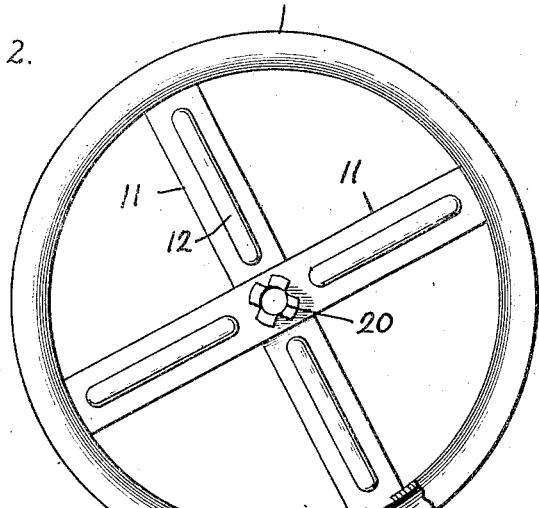
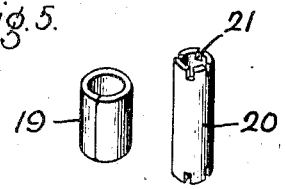
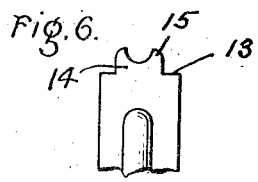
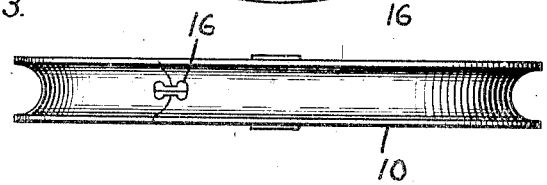
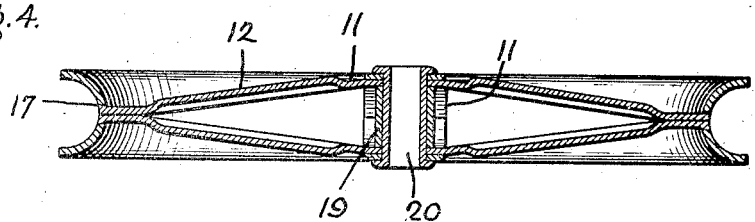

CHRISTIAN STEENSTRUP, OF SCHENECTADY, NEW YORK.

WHEEL.

1,362,363.  Specification of Letters Patent.  Patented Dec. 14, 1920.

Original application filed January 9, 1919, Serial No. 270,398. Divided and this application filed February 2, 1920. Serial No. 355,690.

*To all whom it may concern:*

Be it known that I, CHRISTIAN STEENSTRUP, a citizen of the United States, residing at Schenectady, county of Schenectady, and State of New York, have invented certain new and useful Improvements in Wheels, of which the following is a specification.

The present application is a division of my prior application Serial No. 270,398, filed January 9, 1919, which division is made at the requirement of the United States Patent Office.

The present invention relates to wheels, especially intended for use in clothes-line hangers but which are capable of other uses as well, and has for its object to improve their construction. By reason of my improvements, I am able to produce a wheel having among others, the following necessary and desirable qualities: great strength with minimum weight; true in shape; practically indestructible and very low manufacturing cost. These results are attained by making the rim and spokes of sheet metal and forming them in the manner to be described, whereby the material is so distributed or arranged as to give great strength for a given quantity. Preferably the rim and spokes are formed of the same kind and thickness of metal which permits of its very economical use.

For a consideration of what I believe to be novel in my invention, attention is directed to the following description and claims appended thereto.

In the accompanying drawing, which illustrates one of the embodiments of my invention, Figure 1 is a plan view of a piece of sheet stock for forming a rim; Fig. 2 is a view in side elevation of a complete wheel; Fig. 3 is an edge view of the same; Fig. 4 is a cross section of the wheel; Fig. 5 is a perspective view of the parts forming the hub and spoke securing means; Fig. 6 is a view of one end of a spoke; Fig. 7 is a sectional detail view showing the wheel fitted with a rubber or other resilient tire, and Fig. 8 is a detail sectional view of a modified form of the wheel having a convex rim.

10 indicates the wheel rim which is made of relatively thin sheet metal such as steel, for example. The stock for the rim is either purchased in long, narrow, flat strips or in sheets which are subsequently cut to the desired width. Regardless of the form in which the stock is obtained, its width should be exactly that of the metal in the finished rim since in this manner all trimmings, machine operations, and waste are avoided. The stock is cut to the desired length to form a wheel and the ends properly shaped so that when united they will snugly fit and form a perfect joint. The strip thus formed may then be put in a die and holes or slots 10$^a$ punched to receive the tenons on the spokes, or the ends cut and the holes or slots punched in the same operation. Since the tenons on a pair of spokes serve as a means for uniting the rim at the joint, notches 10$^b$ as distinguished from holes or slots, are punched in both ends of the strip as will be referred to hereinafter. The stock after being prepared is then passed through suitable dies in the form of rollers which give it the desired circular form and also the desired shape in cross-section. For general application as for example, in wheels for pulleys and wheels that are to be provided with rubber tires, the rim should be semicircular in cross-section but the shape can be altered if desired by changing the shape of the forming rolls. Where the wheel is used as a hand wheel for various purposes, the rim may be turned inside out—that is to say, the peripheral surface may be convex as will be readily appreciated. This is shown in Fig. 8.

The spokes 11 of which there are eight in all, arranged in pairs, are all exactly alike so a single die or set of dies may be used in producing them. The stock for the spokes is also in the form of relatively thin, narrow strips, and preferably the same as that used in the rim. After leaving the die each double spoke or spoke member has the bent form shown in Fig. 4 and extends across the rim from side to side. As before stated, there are eight spokes but they are composed of half that number of pieces. To increase their strength they may be ribbed as indicated at 12. Each end of each spoke has a shoulder 13 and a tenon 14. The shoulder engages the rim when the parts are assembled and takes that load which puts the spoke in compression. It will be noted that each tenon has two prongs or projections 15 so that when the metal is riveted or upset after the tenon is inserted in the rim they will spread laterally as indicated at 16 in Fig. 3 and in this manner form in effect a double dovetail which prevents the ends of the rim from separating. It is to be especially noted that the side or edge portions of the tenons are enlarged the most and this is due to the addition of the metal at 15. By this seemingly simple expedient there is obtained a means first for locking the parts of the rim at the joint and second, a means for securing the rim rigidly to the spokes. In practice, it is best to simultaneously upset the tenons of all of the spokes since this avoids distortion of the rim and saves operations.

In actual practice it is found that when the parts are subjected to heavy pressure in the upsetting operation the metal in the rim immediately surrounding the edges of the tenons and prongs is caused to flow. In other words, the notch or slot which originally had straight parallel walls is enlarged at the ends more than in the middle and takes the general form indicated at 16 in Fig. 2. Also that said pressure causes the walls of the notch or slot to yield slightly at their outer edges as indicated at 17 in Figs. 4 and 8. The net result of this is that the outer end of the tenon is made larger than it is at the shoulder 13 so that it will resist strains tending to separate the joint in the rim and also the tendency of the rim to pull away from the spokes when the latter are put in tension as they will be when pressure is applied to the rim at a diametrically opposite point. The amount of stock in the tenons 14 and prongs 15 should be carefully determined so that when the final pressure is applied the outer ends of the tenons will be flush with the surface of the rim. This is important where a smooth surface is essential to good operation.

The fact that the tenons on a pair of spokes enter the adjacent notches 10ᵇ at the joint in the rim prevents the parts of the rim from separating in an axial direction, and the addition of metal in the tenons, as the prongs 15 for example, affords a means for preventing separation at the joint in the plane of the wheel. By making all spokes exactly alike time is saved in assembling for the assembler does not have to be careful in his selection. A further advantage in providing spokes which extend across the wheel and have shoulders and tenons, the latter entering the rim notches and slots, resides in the fact that the spokes will be in exactly the right angular relation one to the other and the holes for the remaining part of hub structure will be in axial alinement with the rim axis.

The spokes also form a part of the hub structure, thereby simplifying the construction, and to this end each spoke member extends across the rim and is provided with a small hole midway between its ends, the axis of which coincides with the axis of the finished wheel. To hold the spokes the desired distance apart at the center a sleeve or spacer 19 is provided which can be made of tubing but which is preferably made of thin sheet metal formed in a die to tubular form as shown in Fig. 5, because it is cheaper and is more easily obtained.

Assuming that the spokes are assembled in pairs with their ends properly located in the rim slots and notches and the spacer 19 in position between the spokes, the bearing 20 is slipped into place and its ends flanged over by subjecting the same to heavy end pressure. This has the effect of securely fastening the hub parts together. The bearing 20 may be made of tubular material but since sheet stock is always cheaper it is preferable to use the latter and to form it into tubular form by a suitable die. Although it has a joint when made in this manner it cannot expand appreciably on account of the surrounding spacer 19. In assembling the spacer and bearing the two joints should be angularly displaced to break joint as distinguished from being alined so as to prevent any tendency of the bearing to enlarge. The ends of the bearing may have slots or notches 21 so as to make it easier to upset or rivet over the ends to hold the spokes and spacer in place. The ends of the bearing also serve as collars or spacing devices to center the wheel and prevent the rim from rubbing when mounted in a hanger. Inside of the bearing is located the usual axle or spindle.

When the wheel is to be used as a road wheel for vehicles, more specifically small wagons for children, baby carriages, etc., it is provided with a rubber tire 24, Fig. 7, secured in place by any approved means.

My improved construction has the advantage of great strength and simplicity, small weight and low manufacturing cost. The rim and spokes are made of sheet metal of identical thickness. This simplifies the matter of maintaining and keeping track of the stock. Further, it enables me to use a good grade of material and yet sell the wheels at a low cost because practically no material is wasted and machining of the parts is unnecessary. Since all of the parts are made by dies and punches of one character or another, skilled labor is not required either in the manufacture of the parts or in their assembly. By actual test and service, I have ascertained that the wheels will stand up under heavy loads without injury of any character. The wheel is very light for its size which means reduced charges for transportation, and it will not break as cast metal does if roughly handled. The rim, due to its shape, is naturally one of great strength, and by using flat spokes which also form a part of the hub structure and connecting them to the rim as described, the benefit of compression on one side of the axle and tension on the other is obtained. By arranging the spokes in pairs and widely separating the hub portions thereof, the wheel is very stiff against buckling strains.

Due to the extreme accuracy with which a wheel of this type can be made, it follows that it will run true on its axle, and because it will run true the sides of the supporting hanger can be placed close thereto and in this manner all danger of the clothes-line getting caught between the wheel rim and the hanger parts is avoided.

In accordance with the provisions of the patent statutes, I have described the principle of operation of my invention, together with the apparatus which I now consider to represent the best embodiment thereof, but I desire to have it understood that the apparatus shown is only illustrative and that the invention may be carried out by other means.

What I claim as new and desire to secure by Letters Patent of the United States, is:

1. In a wheel, the combination of a jointed sheet metal rim having radial, tenon-receiving openings, spokes therefor, and tenons at the extremities of the spokes which unite the rim and spokes, one of said tenons being spread in such manner as to unite and lock the abutting ends of the rim.

2. In a wheel, the combination of a jointed sheet metal rim of annular form having tenon-receiving openings in the central plane thereof, with spokes therefor arranged in pairs, each spoke terminating in tenons which enter said openings and have upset ends to unite the rim and spokes, the tenons on one pair of spokes also serving to unite and lock the abutting ends of the rim.

3. In a wheel, the combination of a sheet metal rim having tenon-receiving openings, relatively narrow sheet metal spokes therefor which extend diametrically across the wheel at an angle to each other and form a part of the hub structure, said spokes terminating in tenons which enter said openings, a tubular spacer at the center of the wheel which holds the spokes apart and forms a part of the hub, and a tubular member separate from and located within the spacer which extends through all of the spokes and is upset at its ends to hold the spokes in place.

4. In a wheel, the combination of a jointed sheet metal rim having tenon-receiving openings, spokes therefor arranged in pairs which extend diametrically across the wheel at an angle to each other and form a part of the hub structure, shoulders and tenons at the extremities of the spokes which enter said openings, said tenons being riveted over to unite the rim and spokes, one pair of tenons also locking the rim at the joint, a tubular spacer which separates the spokes at the center of the wheel, and a tubular bearing member located within the spacer which extends through the spokes and is upset at its ends to hold the spokes in engagement with the spacer.

5. In a wheel, the combination of a jointed sheet metal rim the ends of which have notches which form a tenon-receiving opening, sheet metal spokes therefor which extend diametrically across the rim and form a part of the hub structure, tenons on the spokes which enter the opening and have small projections on the sides which are upset to form double opposed dovetails to lock the parts of the rim at the joint.

6. In a wheel, the combination of an annular jointed rim which is semi-circular in cross-section and has tenon-receiving openings, flat sheet metal spokes arranged in pairs, tenons on each spoke, the tenons at one end of a pair of spokes occupying the same opening in the rim and which are upset to lock the rim and spokes and also to unite the parts of the rim at the joint.

7. In a wheel, the combination of an annular jointed rim composed of a single sheet of metal which has tenon-receiving notches and slots, said rim being semi-circular in cross-section, flat sheet metal spokes arranged in pairs, the spokes of each pair converging from the axis toward the rim, a shoulder and tenon on each spoke, the tenons on one pair of spokes occupying said notches and holding the meeting parts of the rim against axial displacement, and upset prongs on the last named tenons which form means for holding the parts of the rim against separation at the joint in the plane of the wheel.

8. In a wheel, the combination of an annular sheet metal rim which contains radial slots and is curved in cross section, spokes arranged in pairs which overlap at the center of the wheel and form a part of the hub, tenons on the spokes which are located in pairs within the slots and are secured to the rim, and means which are united with the spokes to form the remainder of the hub.

9. In a wheel, the combination of a jointed sheet metal rim which contains notches on opposite sides of the joint and also angularly displaced slots, spokes arranged in pairs, tenons on the opposite ends of the spokes which enter the slots, and upset prongs on the ends of the tenons which enter the notches and form anchoring devices to prevent the parts of the rim from separating at the joint.

In witness whereof I have hereunto set my hand this 30th day of January, 1920.

CHRISTIAN STEENSTRUP.